United States Patent
Di Martino

[15] 3,690,597
[45] Sept. 12, 1972

[54] VERTICAL TAKE-OFF LANDING AIRCRAFT HAVING A PAIR OF COAXIAL COUNTER-ROTATING ROTORS, EACH FORMED BY A SET OF REVOLVABLE BLADES RADIALLY JUTTING FROM THE BODY OF THE CRAFT

[72] Inventor: Renato Di Martino, Parco Margherita n.8, Naples, Italy

[22] Filed: Aug. 19, 1970

[21] Appl. No.: 65,115

[30] Foreign Application Priority Data

Jan. 20, 1970 Italy....................48200 A/70

[52] U.S. Cl. ..............................................244/23 C
[51] Int. Cl. ..............................................B64c 29/00
[58] Field of Search....................................244/23 C

[56] References Cited

UNITED STATES PATENTS 3,395,876  8/1968  Green.....................244/23 C

*Primary Examiner*—Trygve M. Blix
*Attorney*—Ernest G. Montague

[57] ABSTRACT

A vertical take-off landing aircraft, wherein at the periphery of a saucer-shaped body counter-rotate two similar and coaxial rotors. A rotor is composed of an annular caisson moved by gas-turbines and of a set of aerofoil-shaped blades jutting out of the caisson and revolvable around their own axis.

1 Claim, 8 Drawing Figures

PATENTED SEP 12 1972

VERTICAL TAKE-OFF LANDING AIRCRAFT HAVING A PAIR OF COAXIAL COUNTER-ROTATING ROTORS, EACH FORMED BY A SET OF REVOLVABLE BLADES RADIALLY JUTTING FROM THE BODY OF THE CRAFT

The present invention relates to a saucer-shaped aircraft able to fly vertically as well as horizontally by means of the coaxial counterrotation around the body of two sets of radial blades having an aerofoil section and revolvable around their longitudinal axis.

It is one object of the present invention to provide a vertical take-off landing aircraft having a pair of coaxial counter-rotating rotors, each formed by a set of revolvable blades radially jutting from the body of the craft wherein for vertical flights, the pitch of all the blades must be the very same; when level flight is desired in a direction which coincides with the "axis of flight" of the craft, an initial slight increase of the pitch is to be given to the blades moving from the front to the rear of the craft; from this, a non-compensated slight push is created; the consequent slight decrease in lift is to be compensated by an increase of speed of the rotors.

It is another object of the present invention to provide a vertical take-off landing aircraft having a pair of coaxial counter-rotating rotors, each formed by a set of revolvable blade radially jutting from the body of the craft, wherein as soon as the speed begins to be noticeable, the former loss of lift of the "pushing" blades is going to be compensated by an increase of lift of the other blades—i.e., those moving from back to front—whose lifting action is improved from the increased absolute speed (the rotational speed plus the translation speed).

It is yet another object of the present invention to provide a vertical take-off landing aircraft having a pair of coaxial counter-rotating rotors, each formed by a set of revolvable blades radially jutting from the body of the craft, wherein for further increase the speed of the aircraft, the pitch of the blades is increased up to its maximum value, i.e., to the vertical position. Before this point, when the "pushing" blades lose all their lifting power, an increasing good share of the lift is transferred from the moving-forward blades to the body of the craft, whose aerofoil shape (biconvex wing) will work for that purpose.

When the speed is such that all the lift is provided by the body, the pitch of the "lifting" blades may be reduced to nothing in order to get the least drag from them.

It seems rather evident that a horizontal force can be produced in the very beginning of the flight, so that the start from the ground may be oblique, if desired, instead of merely vertical.

With these and other objects in view which will become apparent in the following detailed description, the present invention, which is shown by example only, will be clearly understood in connection with the accompanying drawings, in which.

Figure 1:
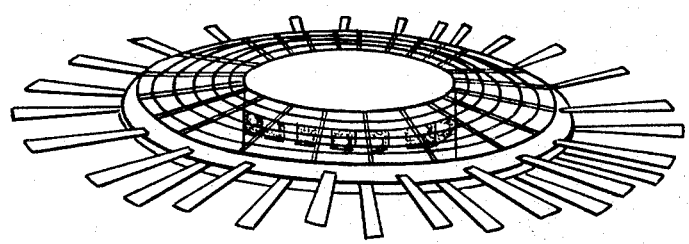
FIG. 1 is a perspective view of the aircraft, shown schematically.
Figure 2:
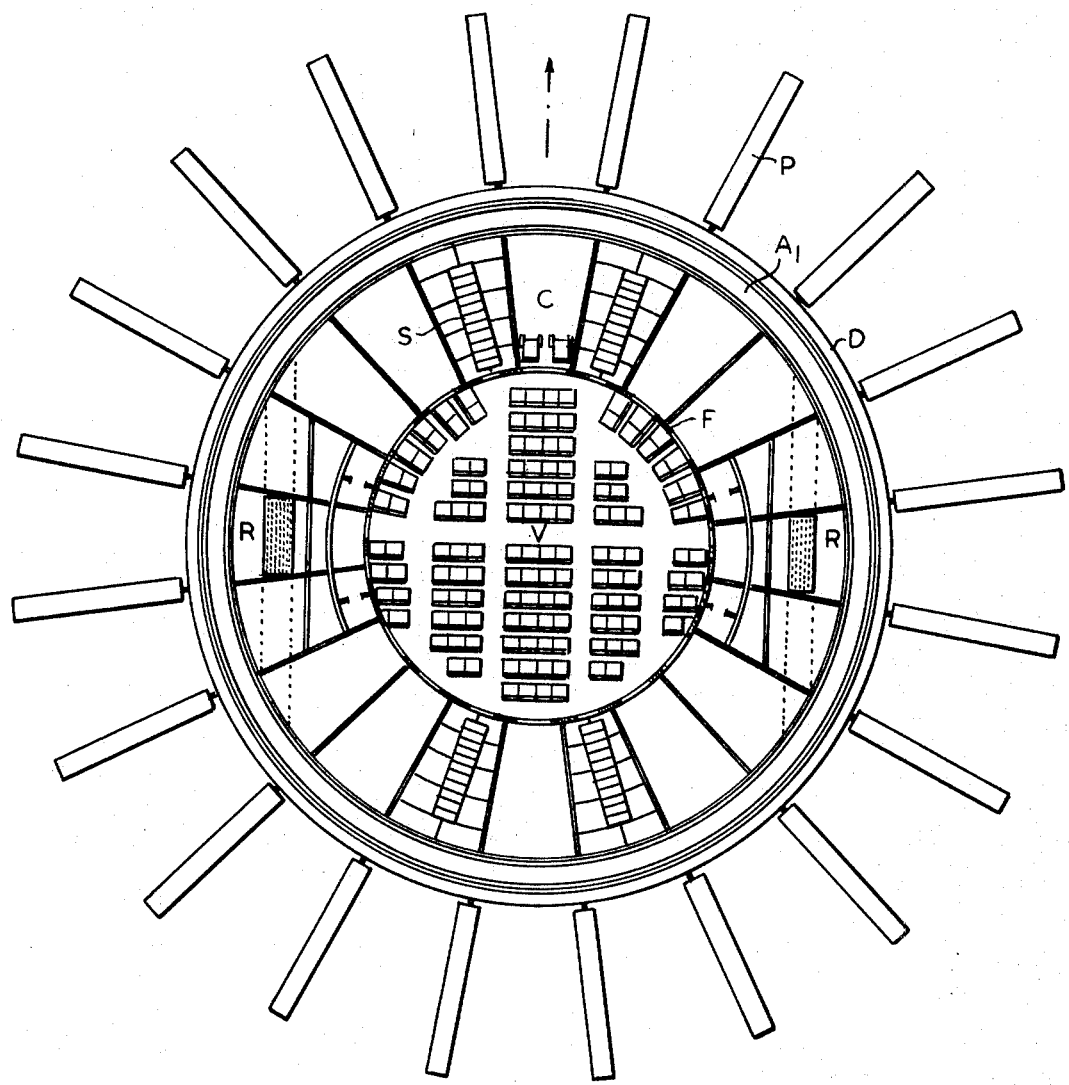
FIG. 2 is a plan view of the same, with a possible arrangement of some components.

Referring now to the drawings, the body of the aircraft designed in accordance with the present invention, has the shape of a saucer with an aerofoil profile; its interior space may be divided into several sections depending upon the destination: a possible arrangement for passenger transport is shown in FIG. 2.

In this case, the passenger cabin V is located in the inner part of the body and is separated from the rest by a partition wall F with windows and doors; all around the passenger cabin are located: the pilot cabin C, the stairs S, the engine rooms R and the utility rooms.

Figure 3:
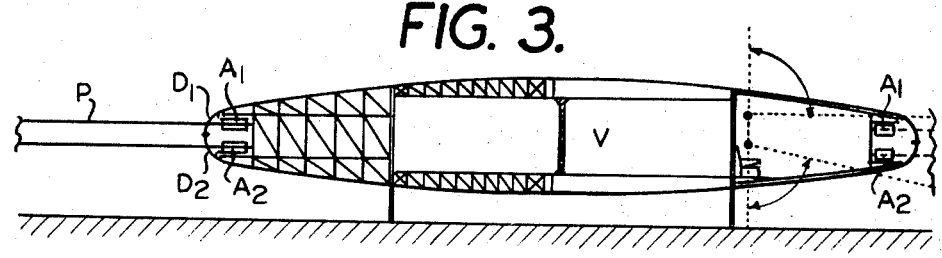
FIG. 3 is a vertical section of the aircraft along the axis of the flight.
Figure 4:
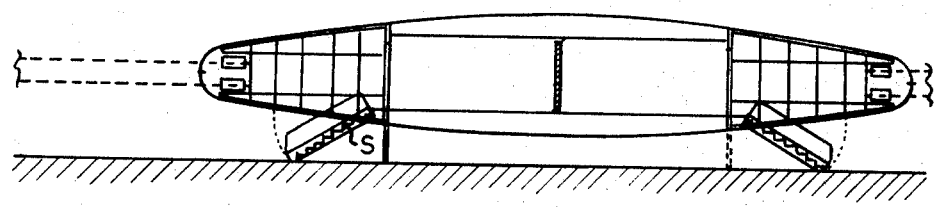
FIG. 4 is a vertical section along a diameter crossing the stairs.
Figure 5:
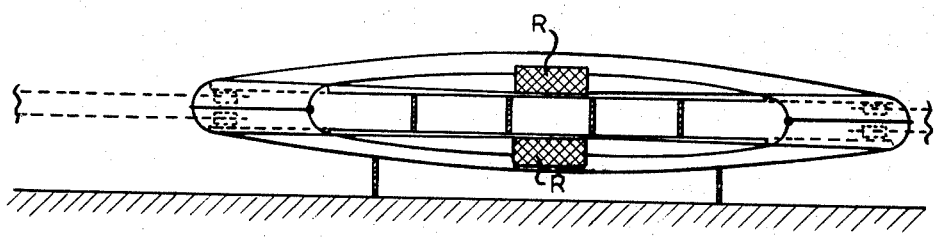
FIGS. 5 and 6 are vertical sections made, respectively, along the axis of the motors and along the diameter perpendicular to the axis of the flight.
Figure 6:
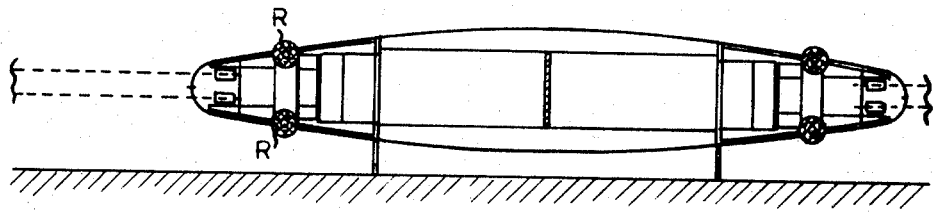

The main feature of the aircraft is constituted from the ensemble of two blade-holder rings $A_1$ and $A_2$ FIGS. 2 and 3, identical to each other, coaxial and counter-rotating around the body.

These annular structures, each formed by a metallic caisson of rectangular section, have their internal diameter slightly larger than the external diameter of the body, in order to let the axles of the blades jut out of the inner wall of the ring in the space, where the apparatus for revolving the blades is located.

Figure 7:
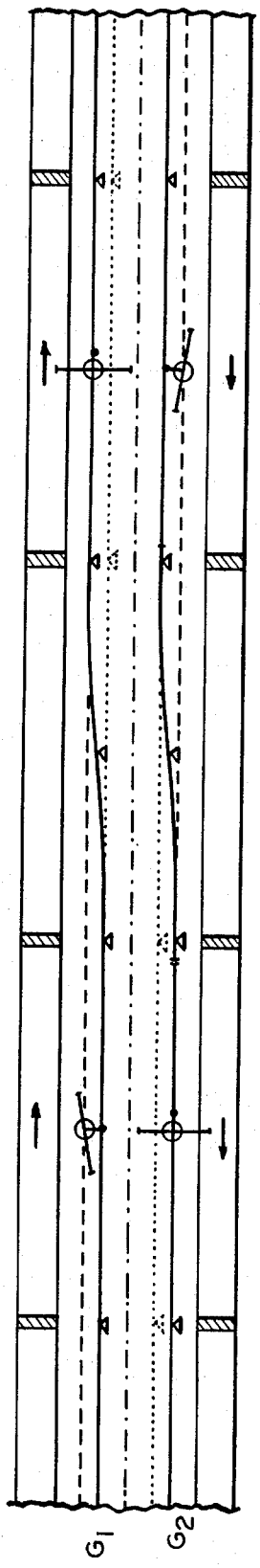
FIGS. 7 and 8 are schematic views indicating the system intended for giving to the blades, automatically, the periodical variation of pitch required for the level flight.
Figure 8:
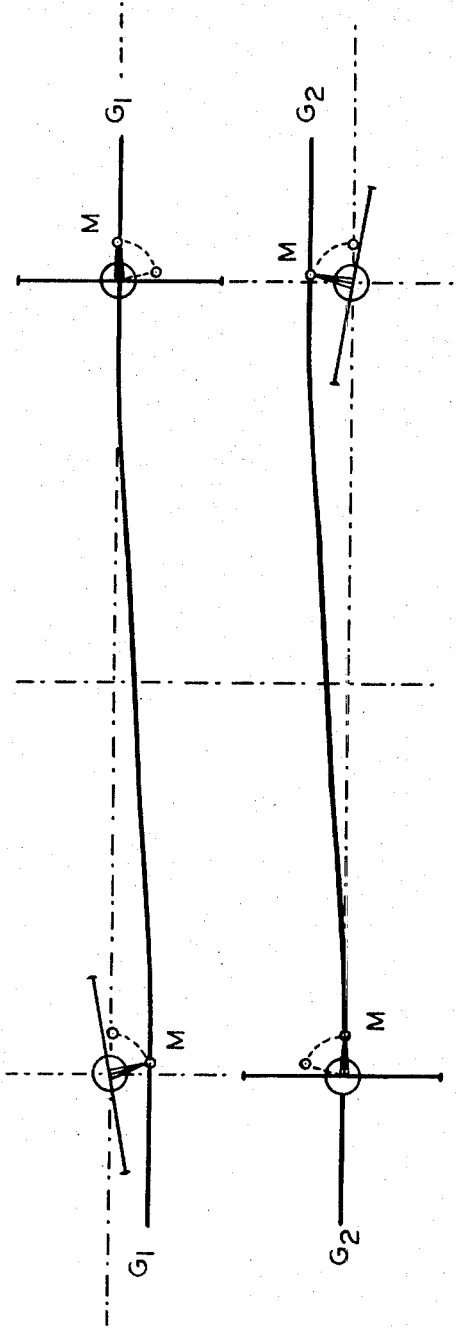

As a matter of fact, on the external wall of the body there are fixed two rails $G_1$ and $G_2$ FIG. 7, one for each ring, intended to guide the cranks M FIG. 8 attached to the axles of the blades; the rails can be moved vertically to some extent—upon command—along the wall of the body, so that the pitch of each blade depends upon the position of the rail, by means of the cranks.

In other words, the rotation of the rings $A_1$ and $A_2$ makes the blades rotate around the body, as well as revolve around their own axle in an amount which is regulated by the position of the rails G whose vertical displacement can be established by the pilot.

The energy for the rotation of the rings is given, throughout normal transmissions, from the motors, R adjacent to the rings.

The centrifugal force of the blades, created from their rotational movement, is borne by a polygonal chain—with as many angles as blades contained in the round caisson.

Each ring is careened on its outside part D in order to give an aerodynamic profile to the craft FIGS. 2 and 3.

When level flight is desired, it is necessary that for each rotor the blades of the right side have different pitch than those of the left side; it is necessary, in other words, that cyclically and automatically, the blades revolve around their own axis in correspondence, or in proximity, to the intersection with the vertical flame passing by the "axis of flight."

This is done by putting FIG. 7 each rail at different heights on each side of the aircraft; consequently, each rail shall have two transition segments, located respectively one in the front and another in the back of the aircraft.

Each of the above-said transition segments T FIG. 8 is made of a separate rail G, having a fulcrum at the center and movable at the end with adequate joints so that, when needed, a flex can be realized without interrupting the continuity of the supporting action of the rail itself.

When at full speed in level flight, the "pushing" blades are set vertically (like the oars of a row-boat) and the "lifting" ones are set almost horizontally, to reduce the drag, since the lifting action has been transferred to the body of the craft.

For the vertical flight as well as for "hovering," it is requested that the counter-rotating rotors have enough speed and that all the blades have the same pitch.

On level flight, the following three stages can be considered:

a. *Low speed:* the lift is only given by the blades;
b. *Average speed:* the lift is shared by both the blades and the body;
c. *High speed:* the lift is given only by the body, purposely having aerofoil section.

On this latest stage, the aircraft's stability is assured by the position of the center of gravity ( below the center of vertical push), by the inertial resistance of the rotating masses and by the fact that the "pushing" action of the blades is much more effective in the front than in the rear so that the craft is actually "pulled" and not "pushed."

The change of direction in a horizontal plane as well as in a vertical plane can be obtained by using small jets, located in such a way as to produce couples acting respectively in the horizontal plane and in the vertical plane perpendicular to the axis of flight (because of the gyroscopic effect due to the rotating masses).

The new aircraft has been described without taking into account the devices related to the transmission and command of the movements, assuming that they can be realized in a conventional manner and are not part of the present invention.

While I have disclosed one embodiment of the present invention, it is to be understood that this embodiment is given by example only, and not in a limiting sense.

I claim:

1. A vertical take-off landing aircraft comprising a body having the shape of a saucer with an aerofoil profile, and divided into a plurality of sections, including a center section, and including an outer wall, a partition wall having windows and bars surrounding said center section, a pilot cabin, engine rooms and utility rooms surrounding said inner section, two blade-holder rings disposed coaxially and counter-rotating around said body; as well as including an inner wall, said two blade-holder rings constituting a metallic caisson and having an inner diameter larger than the outer diameter of said partition wall of said body, a plurality of blades mounted on axles jutting out from the inner wall of said rings, power means for revolving said blades, two rails fixed to said outer wall of said body, each of said rails coordinated to a corresponding of said rings, a crank attached to each of said axles of said blades, and means for moving the axles of said blades in vertical direction, in order to vary the pitch of said blades in response to the position of said rails.

* * * * *